3,387,352
MANUALLY-LOADABLE POWER-OPERATED
TOOL FOR INSTALLING ANTI-SKID STUDS
IN VEHICULAR TIRES
Harvey J. Walter, Parma, Ohio, assignor to The Black
and Decker Manufacturing Company, Towson, Md., a
corporation of Maryland
Filed May 31, 1966, Ser. No. 554,182
4 Claims. (Cl. 29—212)

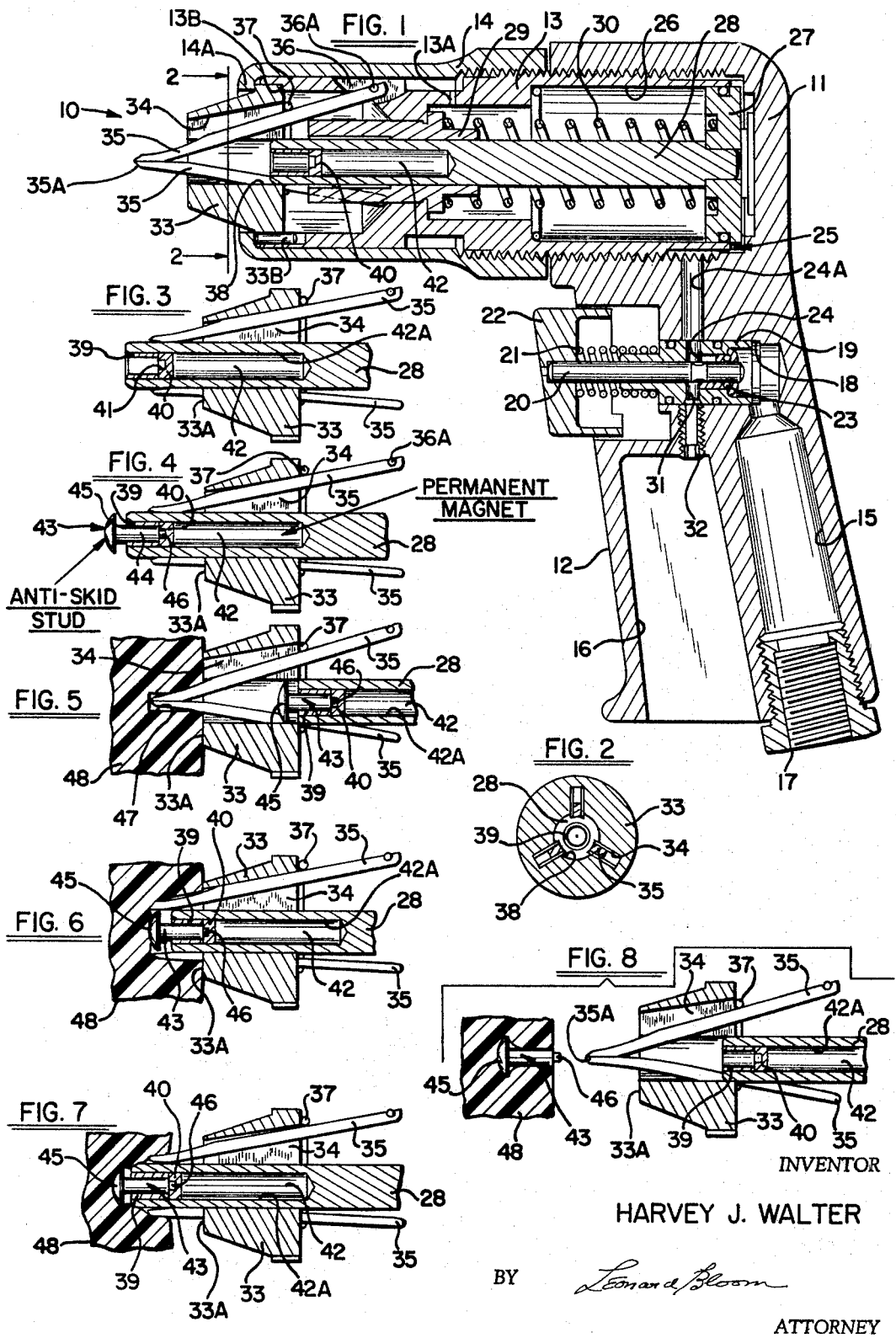

ABSTRACT OF THE DISCLOSURE

The device disclosed herein is a power-operated portable tool for inserting studs into automotive tires and includes a housing having a power-operated plunger means therein adapted to carry a stud and install it within a hole or recess in the tire. Actuation of the plunger means is controlled by a trigger on a handle rigid with the housing, and a plurality of resiliently-biased, normally-closed fingers are guided for limited radial movement relative to a supporting guide means, disposed at the outer end of the housing, and are adapted to be inserted into the tire recess whereupon when the trigger is actuated and the plunger means moves forwardly, the fingers radially enlarge the recess to receive the stud.

---

The present invention relates to a tool and a method for installing anti-skid studs within a vehicular tire, and more particularly, to a portable power-operated tool which is simple, yet rugged and reliable, within the budget of the average garage or service station operator, and features the manual loading of individual studs within a socket formed on the end of a plunger reciprocating within the tool.

In the prior art, various attempts have been made to provide suitable tools for installing anti-skid studs or equivalent devices within holes in an automobile tire. The holes may be drilled immediately previous to insertion of the studs, or else preformed by the tire manufacturer. The tools used in the prior art for inserting the studs invariably comprise a plurality of spring-loaded normally-closed fingers (or equivalent members) which are inserted within the hole in the tire, and the fingers are radially expanded by means of a reciprocating plunger, thereby enlarging the hole in the tire and facilitating the insertion and anchoring of the stud therein by the plunger. Such an arrangement is broadly anticipated in the now-expired Myers Patent 550,560.

Moreover, the prior art tools have been either of the hand-powered type, in which case considerable operator force is required to anchor the individual stud to the desired holding force, or else the tools have been of the power-operated type. In the power-operated tools, the plunger may constitute a spring-loaded piston within a cylinder formed in the tool housing, and the piston may be pneumatically operated by means of a trigger-operated valve cooperating with longitudinal passageways formed in the tool handle providing for inlet and discharge of the compressed air; such an arrangement is disclosed in the now-expired Reinhold Patent 2,134,735.

Furthermore, the power-operated tools heretofore utilized in the art invariably involve a magazine-type or automatic type or feed mechanism, whereby the studs are repeatedly received within a bore or chamber immediately ahead of the reciprocating plunger, and whereby the studs may be individually inserted within the tire upon repeated actuation of the trigger. While offering some recognized advantages insofar as insertion time is concerned, nevertheless, the magazine-fed power-operated tools of the prior art have been somewhat complicated and unwieldy, hence expensive and beyond the budgetary range of the average operator of a service station or garage; and besides, the magazine-feed is subject to jamming and does not positively retain the stud on the plunger, each and every time, in proper alinement.

Accordingly, it is the primary object of the present invention to correct the deficiencies of the prior art by providing a reliable relatively low-cost portable power-operated tool, one which is well within the economic range of the average operator of a garage or service station.

It is another object of the present invention to provide a manually-loadable power-operated tool for installing individual anti-skid studs within preformed holes in the tread of an automobile or truck tire.

It is a further object to provide a power-operated tool for insuring that the studs will be inserted within the elastic material of the tire in proper straight alinement, that is, not cocked or canted as is sometimes the case with prior art designs.

It is a specific object to provide a socket on the end of the plunger for receiving the stud therein, whereby the stud is carried by the plunger in proper alinement therewith, in combination with a permanent magnet mounted within the plunger adjacent to the socket for positively retaining the stud on the plunger and preventing its disengagement even though the tool may be pointed downwardly in seating the stud in the tire.

It is a further object to provide a method of inserting an anti-skid stud in a hole formed in a vehicular tire, which comprises the steps of providing a power-operated tool having a plunger selectively controlled through a trigger on the tool; actuating the trigger to advance the plunger forwardly of the tool; loading an individual stud on the plunger; releasing the trigger to withdraw the plunger and stud within the tool; inserting a portion of the tool within the hole formed in the vehicular tire; actuating the trigger to advance the plunger and stud forwardly of the tool, thereby causing the portion of the tool which is inserted within the hole to expand the same, thereby facilitating the insertion of the stud within the hole; and withdrawing the tool away from the tire, whereby the resilient material of the tire contracts around the stud, and whereby the stud is anchored within the tire. The withdrawal of the tool is facilitated by a reaction on the tool created as a result of the stud being driven into the tire; and during this withdrawal step, the trigger may either be released or else continually actuated, depending upon the operator's technique.

In accordance with the broad teachings of the present invention, there is herein illustrated and described, a manually-loadable power-operated tool for installing an anti-skid stud within a hole in a tire; and the tool comprises a housing provided with a power-operated plunger which is selectively actuated by a trigger means. A socket means is formed on the end of the plunger, and means are provided constantly urging the plunger towards a normally-retracted position within the housing. The trigger means may be engaged to advance the plunger forwardly of the housing against the constantly-urging means; an individual stud thereafter may be manually loaded within the socket means on the plunger; and the trigger means then may be released to retract the plunger within the housing. Means are further provided for engaging the hole in the tire and radially enlarging the same upon the subsequent re-engagement of the trigger means and the advancement of the plunger and stud forwardly of the housing, thereby installing the stud within the hole in the tire.

These and other objects of the present invention will become apparent from a reading of the following specification, taken in conjunction with the enclosed drawings, in which:

FIGURE 1 is a longitudinal section of a preferred embodiment of the manually-loadable power-operated tool of the present invention;

FIGURE 2 is a transverse section, taken along the lines 2—2 of FIGURE 1, and illustrating the manner in which the normally-closed spring-loaded fingers are guided within circumferentially-spaced radial slots formed within a cone guide member; and FIGURES 3–8 illustrate the operating sequence in the preferred method of loading the stud within the tool and subsequently driving the stud for installation within the hole formed in the tire.

As previously noted, the general concept of a plurality of normaly-closed spring-loaded fingers actuated by means of a coaxially-disposed reciprocating plunger for radially enlarging a hole in a vehicular tire for thereby facilitating the insertion and anchoring of the stud within the tire, as well as the general concept of a pneumatically-operated reciprocating plunger selectively actuated by means of a suitable trigger and valving arrangement, are both recognized as quite old in the art, hence form no part of the present invention, and will be described herein only for purpsoses of making a complete disclosure.

With this in mind, and the reference to FIGURE 1, the tool 10 generally comprises a main housing 11 including a handle portion 12, a barrel 13 secured to the casing and projecting forward therefrom, and a cover housing memberd 14. A pair of longitudinal cavities or conduits 15 and 16 are formed within the handle. Conduit 15 comprises the inlet conduit and is connected to a source of compressed air by a suitable fitting 17, while conduit 16 comprises the discharge conduit. Inlet conduit 15 communicates with a transverse passageway 18, and a valve bushing 19 is mounted in the passageway. A valve stem 20 is slidably guided within the bushing. The valve stem is spring loaded by means of the coil spring 21 and carries a trigger member 22 on its end. The other end of the valve stem carries a slotted valve element 23 which is unseated upon inward depression of the trigger. The inlet cavity 15 thereby communicates with the interior of the bushing 19, with a cross port 24 and canal 24a, and with suitable passageways denoted generally as at 25. The passageways 25 in turn communicate with the open rear end of the barrel 13. A cylindrical chamber 26 is formed within the barrel, and a piston 27 is guided for limiting axial reciprocation within the chamber. The piston 27 is secured to a piston rod 28 which is guided within a bushing 29 fixed within the barrel. The piston and the piston rod thus comprise the power-operated plunger, and the plunger is spring-loaded by means of the coiled spring 30, which constantly urges the plunger rearwardly into its retracted position as shown in FIGURE 1 of the drawing.

When the trigger 22 is depressed, the compressed air is admitted to the chamber 26 to advance the piston and its piston rod 28 forwardly of the housing; and when the trigger 22 is released to its normal position, the piston rod 28 is automatically retracted within the barrel 13. Upon retraction of the piston, the air is discharged back through the passageways 25, canal 24a, and cross port 24, to a second cross port 31 formed in the valve bushing 19, thence through a hollow set screw 32, to the discharge conduit 16. The hollow set screw 32, moreover, serves the further purpose of retaining the valve bushing within the housing. Further a bleed hole 13a is provided to allow any entrapped air to be discharged to atmosphere upon the advance of the piston 27.

A cone guide member 33 is retained within the forward portion of the barrel 13. Preferably, the member 33 is retained between a flanged portion 14a of the cover member 14 and a shoulder 13b on the barrel, and is keyed against rotation by a pin 33b. A plurality of radial slots 34, preferably three in number, are formed within the cone guide member 33. A corresponding plurality of fingers 35 are guided for limited radial movement within the respective slots 34. Each finger has its inner end received within a slot 36 formed in the barrel and pivoted thereto by means of a pin 36a. A resilient ring 37 surrounds the fingers, intermediately of their length, thereby providing a constant bias force on the fingers to maintain their tips 35a in a normally closed posiion. The cone guide member further has a bore 38 for receiving the front end of the piston rod 28.

In accordance with the teachings of the present invention, a socket means is formed on the end of the piston rod 28. This socket means preferably comprises a sleeve 39 and a member 40 rearwardly adjacent to the sleeve. This member 40 has a central pocket 41 coaxially formed therein. A cylindrically-formed permanent magnet 42 is received within a bore 42a in the piston rod, rearwardly adjacent to the member 40. The purpose of the socket means (including the permanent magnet 42) is to positively retain a stud 43 on the end of the piston rod, prevent disengagement of the stud from the piston rod regardless of the position of the tool, and maintain the stud properly alined with the piston rod and precluded from assuming a cocked position with respect thereto.

Any particular anti-skid stud 43 may be used, consonant with the teachings of the present invention. As shown in FIGURE 4, however, the stud preferably comprises a cylindrical body portion 44, a headed or flanged portion 45, and a pilot or tip portion 46.

The operating sequence is as follows: When the trigger 22 is depressed, the piston 27 and piston rod 28 are urged forwardly of the housing; and accordingly, the end of the piston rod spreads the normally-closed fingers 35 and assumes a position axially beyond their tips 35a as shown in FIGURE 3.

With the trigger 22 depressed and the plunger so extended, the operator loads the stud 43 within the socket means formed on the end of the piston rod 28. As shown in FIGURE 4, the tip 46 of the stud 43 is received within the pocket 41 of the member 40; the body 44 of the stud is received within the sleeve 39; and the head 45 of the stud extends axially beyond the end of the piston rod. In this position, the permanent magnet 42 serves to maintain the stud within its socket even though the tool may be held in a downwardly-canted position.

Next, as shown in FIGURE 5, the trigger 22 is released; the piston rod 28 and stud 43 are accordingly retracted within the tool; and the tool is applied to the hole 47 in the tire 48. In this position, the tips 35a of the fingers 35 are inserted within the hole, and the front face 33a of the cone guide member 37 is received flush against the tread surface of the tire, thus limiting the extent to which the fingers are inserted within the hole.

Next, as shown in FIGURE 6, the trigger 22 is again depressed; the piston rod 28 and stud 43 are thus advanced axially of the cone guide member 33; the fingers 35 are thus forced radially outwardly within their respective slots 34; and the tips 35a of the fingers radially enlarge the hole 47 in the tire 48.

Thereafter, and as shown in FIGURES 7 and 8, the tool is withdrawn away from the tire 48, thereby leaving the stud 43 anchored in the tire. This withdrawal action is, at least in part, assisted by the reaction of the tire to the driving force exerted by the piston rod 28 on the stud 43. If desired, the trigger may be released simultaneously with the step of withdrawing the tool away from the tire. However, the preferred technique is to maintain the trigger depressed during the withdrawal of the tool from the tire. This maintains the biasing force of the piston rod on the stud for a slightly greater length of time, and besides, maintains the piston rod extended so that another stud may be loaded in the socket for another cycle of operation. In this manner, the total time for inserting the required studs in a tire is somewhat shortened and, counting the usual "set up" time, approaches the total required time of the much more-expensive magazine-fed machines.

As shown in FIGURE 8, the resilient material of the tire 48 contracts or flows around the head 45 of the stud 43, thereby anchoring the stud securely within the tire.

Obviously, many modifications may be made without departing from the basic spirit of the present invention; and accordingly, within the scope of the appended claims, the invention may be practiced other than has been specifically described herein.

I claim:

1. A power-operated tool for installing an anti-skid stud within a hole in a tire, comprising:
   (A) a housing provided with a power-operated plunger selectively actuated by trigger means;
   (B) socket means formed on the end of the plunger for receiving an individual stud;
   (C) means positively retaining the stud within the socket means on the end of the plunger and maintaining the stud alined with respect to the plunger;
   (D) means constantly urging the plunger towards a normally-retracted position within the housing;
   (E) a guide member mounted on the housing, concentrically of the plunger, and having a forward face engaging the surface of the tire; and
   (F) a plurality of resilient-biased normally-closed fingers, guided for limited radial movement within the guide member, and adapted to be inserted within the hole in the tire for radially enlarging the same upon the selective actuation of the trigger means and the advancement of the plunger and stud forwardly of the housing, thereby installing the stud within the hole in the tire.

2. A power-operated tool for installing an anti-skid stud within a hole in a tire, comprising:
   (A) a housing provided with power-operated plunger means selectively actuated by trigger means;
   (B) the end of the plunger means being formed to receive an individual stud;
   (C) said stud being supported by the end of the plunger means and generally aligned with respect thereto;
   (D) means constantly urging the plunger means towards a normally-retracted position within the housing;
   (E) a guide member mounted on the housing concentrically of the plunger means; and
   (F) a plurality of resiliently-biased normally-closed fingers, guided for limited radial movement within the guide member, and adapted to be inserted within the hole in the tire for radially enlarging the same upon selective actuation of the trigger means and the advancement of the plunger means and stud forwardly of the housing, thereby installing the stud within the hole in the tire.

3. A tool as described in claim 2 which includes:
   (A) a permanent magnet carried by said plunger means for releasably holding said stud.

4. A power-operated tool for installing an anti-skid stud within a hole in a tire, comprising:
   (A) a housing provided with power-operated plunger means selectively actuated by trigger means;
   (B) means constantly urging the plunger means toward a normally retracted position within the housing but allowing advancement of said plunger means upon actuation of said trigger means;
   (C) the end of the plunger means being positioned to have a stud delivered substantially concentrically of said plunger means and being adapted to hold said stud during advancement of said plunger means;
   (D) a guide member mounted on the housing concentrically of the plunger means; and
   (E) a plurality of resiliently-biased normally-closed fingers, guided for limited radial movement within the guide member, and adapted to be inserted within the hole in the tire for radially enlarging the hole upon selective actuation of the trigger means and the advancement of the plunger means and stud held thereby forwardly of the housing, thereby installing the stud within the hole in the tire.

References Cited

UNITED STATES PATENTS

| | | | |
|---|---|---|---|
| 550,560 | 11/1895 | Myers | 81—15.7 |
| 916,026 | 3/1909 | Sasseman | 227—149 |
| 2,134,735 | 11/1938 | Reinhold | 222—262 |
| 2,911,645 | 11/1959 | Crossen | 227—147 |
| 3,258,835 | 7/1966 | Boggild et al. | 29—212 |
| 3,348,291 | 10/1967 | Niedzwiecki | 29—212 |

THOMAS H. EAGER, *Primary Examiner.*